United States Patent
Yoon

[11] Patent Number: 5,917,647
[45] Date of Patent: Jun. 29, 1999

[54] ACTUATOR HAVING AN ASYMMETRIC RIGID STRUCTURE FOR CHANGING AN OPTICAL BEAM PATH AND METHOD FOR DRIVING THE SAME

[75] Inventor: Yong-seop Yoon, Seoul, Rep. of Korea

[73] Assignee: Samsung Electronics Co., Ltd., Kyungki-do, Rep. of Korea

[21] Appl. No.: 09/111,589

[22] Filed: Jul. 7, 1998

[30] Foreign Application Priority Data

Aug. 26, 1997 [KR] Rep. of Korea .................. 97-40808

[51] Int. Cl.⁶ .................................................. G02B 26/08
[52] U.S. Cl. ........................ 359/298; 359/223; 359/318
[58] Field of Search .................................... 359/223, 224, 359/290, 291, 295, 298, 318, 849, 871

[56] References Cited

U.S. PATENT DOCUMENTS

| 5,212,582 | 5/1993 | Nelson | 359/224 |
| 5,621,371 | 4/1997 | Dvorkis et al. | 235/462 |
| 5,739,941 | 4/1998 | Knipe et al. | 359/224 |

FOREIGN PATENT DOCUMENTS 10-208266  8/1998  Japan .

*Primary Examiner*—Georgia Epps
*Assistant Examiner*—Margaret Burke
*Attorney, Agent, or Firm*—Sughrue, Mion, Zinn Macpeak & Seas PLLC

[57] ABSTRACT

An actuator having an asymmetric rigid structure for changing an optical beam path. The actuator has a base plate installed in a cover, first electrodes installed on an upper surface of the base plate by evaporation, a driving electrode disposed between the first electrodes, a pair of support plates each installed on a respective one of the first electrodes for receiving a voltage from the first electrodes, a reflecting plate disposed between the pair of support plates for reflecting an incident beam emitted from a beam source, and asymmetric members connected to the reflecting plate for adjusting an incident path of the incident beam and an inclination angle of a reflection beam with respect to the incident beam. The actuator can easily adjust the incident path of the incident beam and an inclination angle of the reflection beam with respect to the incident beam by asymmetrically inclining the reflecting plate. The actuator has only one driving electrode so that the driving conduit thereof is simply formed and reliable operation thereof is be attained.

9 Claims, 9 Drawing Sheets

ACTUATOR HAVING AN ASYMMETRIC RIGID STRUCTURE FOR CHANGING AN OPTICAL BEAM PATH AND METHOD FOR DRIVING THE SAME

BACKGROUND OF THE INVENTION

1. Field of the Invention

The present invention relates to an actuator having an asymmetric rigid structure and method for driving the same. More particularly, the present invention relates to an actuator having an asymmetric rigid structure for changing an optical beam path and a method for driving the same, in which a path of an incident beam can be adjusted in a simple manner and an inclination angle of a reflection beam with respect to the incident beam can be varied from an acute angle to an obtuse angle.

2. Description of the Prior Art

Generally, an incident beam emitted from a beam source is reflected by a mirror and is projected onto a screen such that the proportion of breadth to length is in the ratio of 16 to 9.

In a conventional actuator for driving a reflecting plate which reflects the incident beam, as shown in FIG. 1, a projection lens 4 is disposed in a case (not shown) in order to project the incident beam emitted from an image projection section towards a screen 2.

The image projection section comprises a beam source 10 disposed in a cover 22 so as to emit color beams such as red, green, and blue, a lens 12 disposed in the front of beam source 10 for focusing the color beams emitted from beam source 10, and a dichromatic mirror 14 for reflecting an incident beam introduced through lens 12.

A projection lens 4, which is inclined with respect to dichromatic mirror 14, is installed in a position to receive light from dichromatic mirror 14. An inclination angle and a movement of dichromatic mirror 14 are adjusted by an actuator 20, shown in FIG. 2a, in such a manner that the incident beam introduced through lens 12 can be projected onto screen 2 along a predetermined incident path.

Actuator 20 comprises a support plate 24 installed in a cover 22, a cantilever bar 26 having a fixing end connected to support plate 24 and a free end, and a piezoelectric element 28 attached to a center of an upper surface of bar 26 so as to generate a piezoelectric phenomena. Dichromatic mirror 14 is disposed on the free end of bar 26.

In the conventional actuator having the above construction, the incident color beams of red, green and blue, which are sequentially emitted from beam source 10, are projected onto dichromatic mirror 14 through lens 12. Then, dichromatic mirror 14 is driven by actuator 20 so as to allow the incident beams to have a predetermined inclination angle and a predetermined incident path. After that, dichromatic mirror 14 reflects the incident beams onto screen 2.

That is, when a voltage is applied to piezoelectric element 28, the free end of bar 26 is subjected to a bending stress as shown in FIG. 2b, thereby adjusting the inclination degree of dichromatic mirror 14 according to the incident beams introduced into dichromatic mirror 14.

Accordingly, the inclination degree of dichromatic mirror 14 is adjusted according to a difference of electric potential applied to piezoelectric element 28. Therefore, the incident path of the incident beam and the inclination angle of the reflection beam with respect to the incident beam are changed according to the inclination degree of dichromatic mirror 14. The reflection beam is projected onto screen 2, thereby creating a color image having a predetermined length and breadth ratio.

However, because the incident path of the incident beam and the inclination angle of the reflection beam with respect to the incident beam are changed by the bar which is bent by the difference of electric potential applied to the piezoelectric element, the bar is subjected to a hysteresis when the actuator is used for a long time. For this reason, the path of the incident beam and the inclination angle of the reflection beam with respect to the incident beam cannot be precisely adjusted, and accordingly, it is difficult to precisely project the reflection beam onto the screen.

In order to solve the above problem, another conventional actuator 40 for changing a beam path has been suggested. As shown in FIG. 3, actuator 40 comprises a pair of support plates 42 which are fixed in cover 22 forming the image projection section and are spaced a predetermined distance apart from each other. Support plates 42 are attached to a base 41. A dichromatic mirror 44 for reflecting the incident beam introduced thereto through lens 12 from beam source 10, is disposed between support plates 42. A metal plate 46, on which dichromatic mirror 44 is attached, has a first end of each torsion bar 48 fixed to a respective side thereof. The second end of each torsion bar 48 is hinged to a respective support plate 42.

Disposed below metal plate 46 are first and second driving electrodes 50 and 52 which define an axis that is perpendicular to that of the torsion bars 48. Driving electrodes 50 and 52 are disposed on base 41 in such a manner that the reflection beam can be emitted into lens 4 by adjusting the inclination angle of the reflection beam and the incident path of the incident beam according to the position that the incident beam is introduced into dichromatic mirror 44.

In the actuator for changing the beam path having the above construction, when the incident beam emitted from beam source 10 is emitted into dichromatic mirror 44 through lens 12, dichromatic mirror 44 permits the incident beam to have a predetermined inclination angle and a predetermined incident path, and guides the incident beam onto screen 2 by reflecting the incident beam.

When it is required to change the inclination angle and the incident path of the reflection beam projected onto screen 2, a voltage is applied to at least one of first and second driving electrodes 50 and 52, for example to the first driving electrode 50. Then, as shown in FIG. 4a, metal plate 46 is inclined towards first driving electrode 50 by a static electricity attraction force which is generated by an electrostatic induction due to the difference of electric potential applied between metal plate 46 and first driving electrode 50.

Accordingly, the incident beam is reflected by inclined dichromatic mirror 44 and is projected onto screen 2 while having the predetermined incident path and inclination angle (acute angle). At this time, a torsion is still applied to torsion bars 48 which are fixed to both sides of metal plate 46.

In addition, when it is required to return dichromatic mirror 44 to its initial position or when it is required to make an obtuse inclination angle by inclining metal plate 46 in the reverse direction as shown in FIG. 4b, the voltage applied to first driving electrode 50 is turned off such that the difference of electric potential between first driving electrode 50 and metal plate 46 is removed. Then, if the difference of electric potential is applied between second driving electrode 52 and metal plate 46, metal plate 46 is returned to its initial position by a restoring force of torsion bars 48 and by the voltage applied to second driving electrode 52. At the same time, a static electricity attraction force acts between metal plate 46 and electrode 52 so that dichromatic mirror 44 attached to metal plate 46 is inclined in the reverse direction, thereby making an obtuse inclination angle of the reflection beam with respect to the incident beam.

However, since the actuator changes the incident path of the incident beam and the inclination angle of the reflection beam with respect to the incident beam by static electricity, the metal plate on which the dichromatic mirror is attached adheres to the first driving electrode or the second driving electrode and is not easily separated therefrom. In addition, since the torsion bars are subjected to torsion force when the metal plate is inclined in one direction, the torsion bars are easily fractured as compared with bars that are subjected to bending stress. Moreover, the actuator requires first and second driving electrodes, thus electric power is unnecessarily consumed and the conduit structure is complicated.

SUMMARY OF THE INVENTION

The present invention overcomes the above described problems of the prior art. Accordingly it is an object of the present invention to provide an actuator having an asymmetric rigid structure for changing an optical beam path and method for driving the same, in which a plate for adjusting an inclination angle of a reflection beam and a path of an incident beam is asymmetrically inclined. This structure not only prevents a dichromatic mirror from adhering to a driving electrode, but also provides for a simple conduit structure.

Another object of the present invention is to provide an actuator having an asymmetric rigid structure which is subjected to a bending stress thereby improving the reliable operation of the actuator, and a method for driving the same.

To achieve the above objects, the present invention includes an actuator having an asymmetric rigid structure for changing an optical beam path. The actuator comprises: a base plate installed in a cover; first electrodes installed on an upper surface of the base plate by an evaporation process; a driving electrode disposed between the first electrodes; a pair of support plates, which are installed on the first electrodes, for receiving a voltage from the first electrodes; a reflecting plate for reflecting an incident beam emitted from a beam source, the reflecting plate being disposed between the pair of support plates; and asymmetric members which are respectively connected to the support plates and the reflecting plate for adjusting an incident path of the incident beam and an inclination angle of a reflection beam with respect to the incident beam.

According to a preferred embodiment of the present invention, asymmetric members include first and second springs which are respectively connected to opposite sides of the reflecting plate and have a different coefficient of stiffness from each other.

Shapes and the coefficient of stiffness of the first and second springs are different from one another so that when static electricity is generated between the driving electrode and the reflecting plates, the incident path of the incident beam and the inclination angle of the reflection beam are variably adjusted.

To further achieve the objects of the present invention, the present invention provides a method of driving an actuator having an asymmetric rigid structure for changing a path of an incident beam and an inclination angle of a reflection beam with respect to the incident beam, the method comprising the steps of: applying a voltage to first electrodes installed on a base plate, by an evaporation process, in such a manner that the voltage is transmitted to a reflecting plate which reflects the incident beam; generating static electricity between the reflecting plate and a driving electrode by applying the voltage to the driving electrode installed between the first electrodes; making the inclination angle by inclining the reflecting plate towards a first asymmetric member having a large amount of deformation as compared to a second asymmetric member; projecting the reflection beam at an acute angle by introducing the incident beam into the reflecting plate from the side of the reflecting plate to which the first asymmetric member is attached; shutting off the voltage applied to both electrodes and the driving electrode thereby removing a difference of electric potential between the driving electrode and the reflecting plate; and returning the reflecting plate to a horizontal position thereof by a restoring force of the asymmetric member.

According to a preferred embodiment of the present invention, the step of making the inclination angle an obtuse angle includes a sub-step of changing positions of the asymmetric members connected to the reflecting plate with respect to each other so that the beam is incident from the side of the reflecting plate to which the second asymmetric member is attached thereby adjusting the inclination angle of the reflecting plate to an obtuse angle.

BRIEF DESCRIPTION OF THE DRAWINGS

The above objects and other advantages of the present invention will become more apparent by describing in detail a preferred embodiment thereof with reference to the attached drawings, in which.

DETAILED DESCRIPTION OF THE PREFERRED EMBODIMENT

Figure 1:
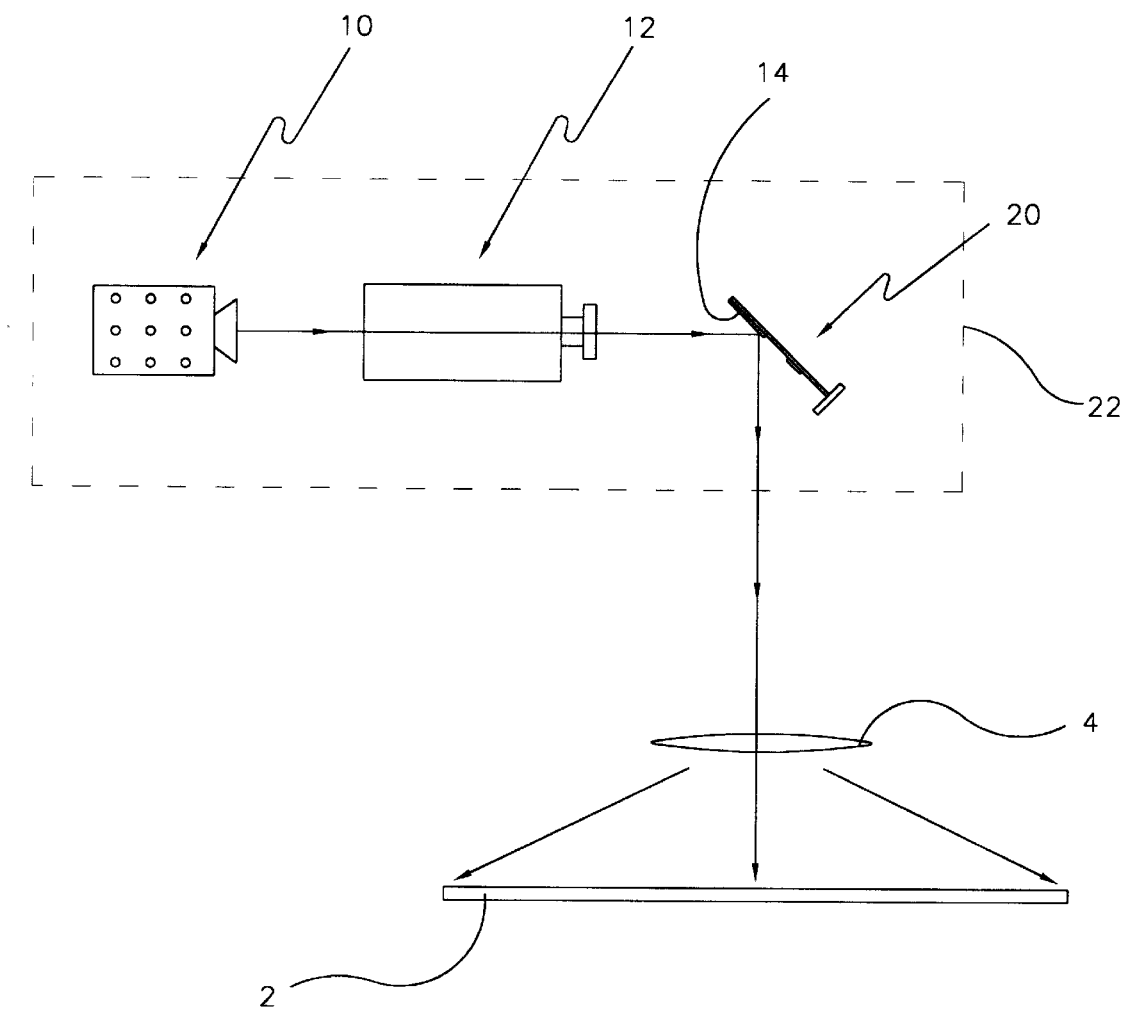
FIG. 1 is a view showing a path of an optical beam projected onto a screen according to the prior art.
Figure 2A:
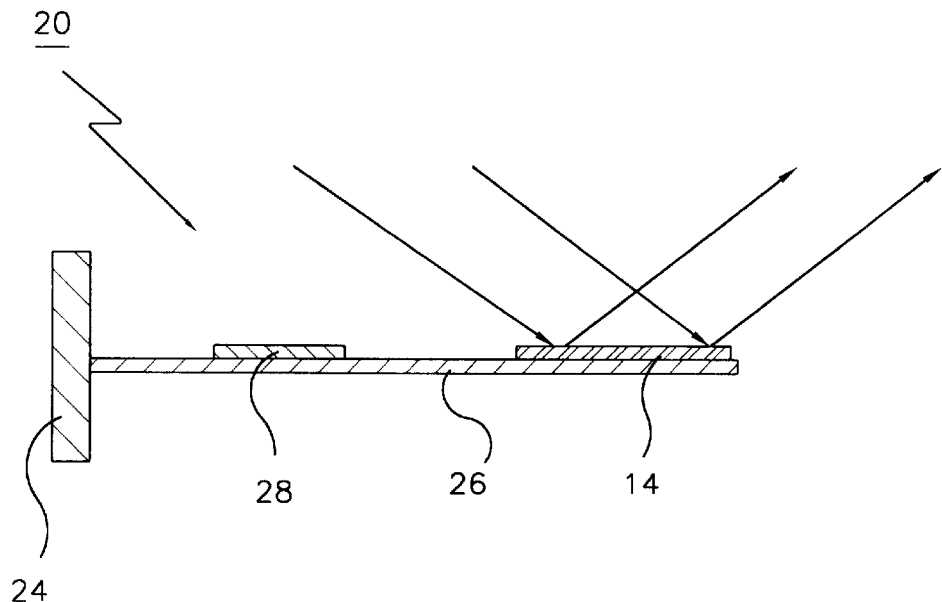
FIG. 2a is a front view showing a conventional actuator for changing a beam path.
Figure 2B:
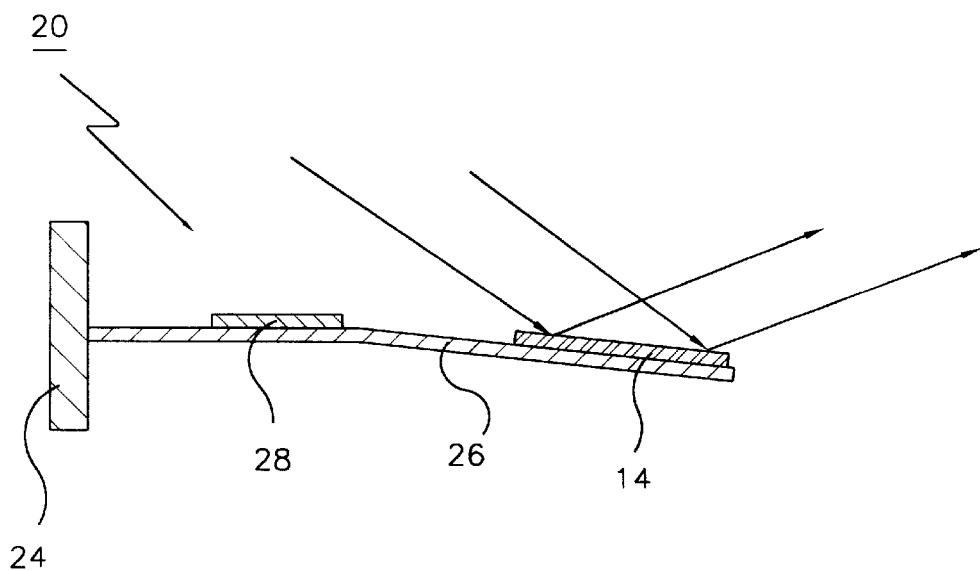
FIG. 2b is a front view showing the actuator of FIG. 2a in which a piezoelectric element is bent due to a difference of electric potential.
Figure 3:
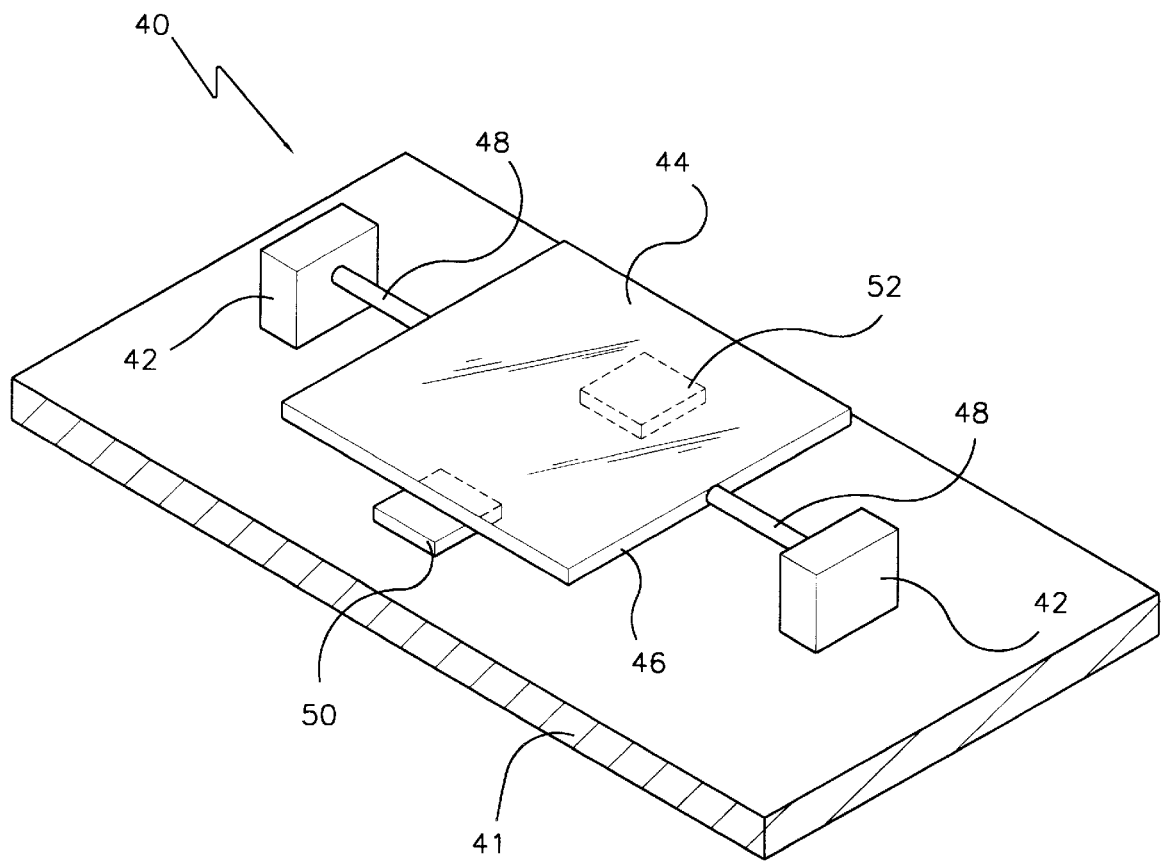
FIG. 3 is a perspective view showing another conventional actuator for changing a beam path.
Figure 4A:
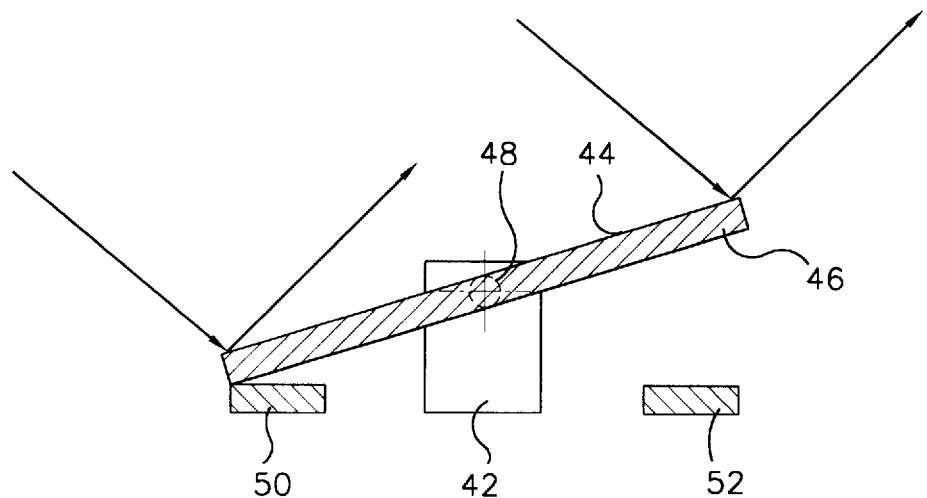
FIGS. 4a and 4b are side views showing a dichromatic mirror of the actuator shown in FIG. 3, which is inclined by driving electrodes.
Figure 4B:
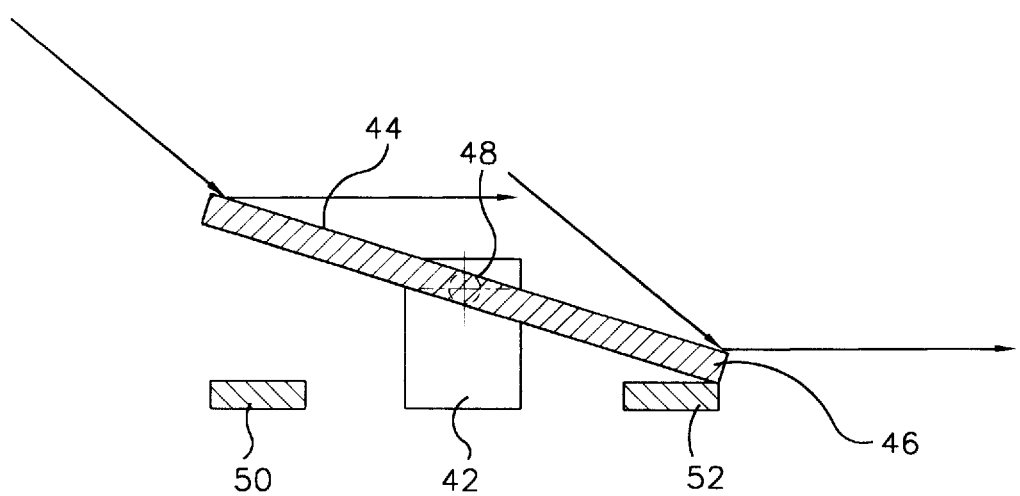

Hereinafter, a preferred embodiment of the present invention will be described with reference to the accompanying drawings. In the drawings, similar elements have similar reference numerals.

Figure 5:
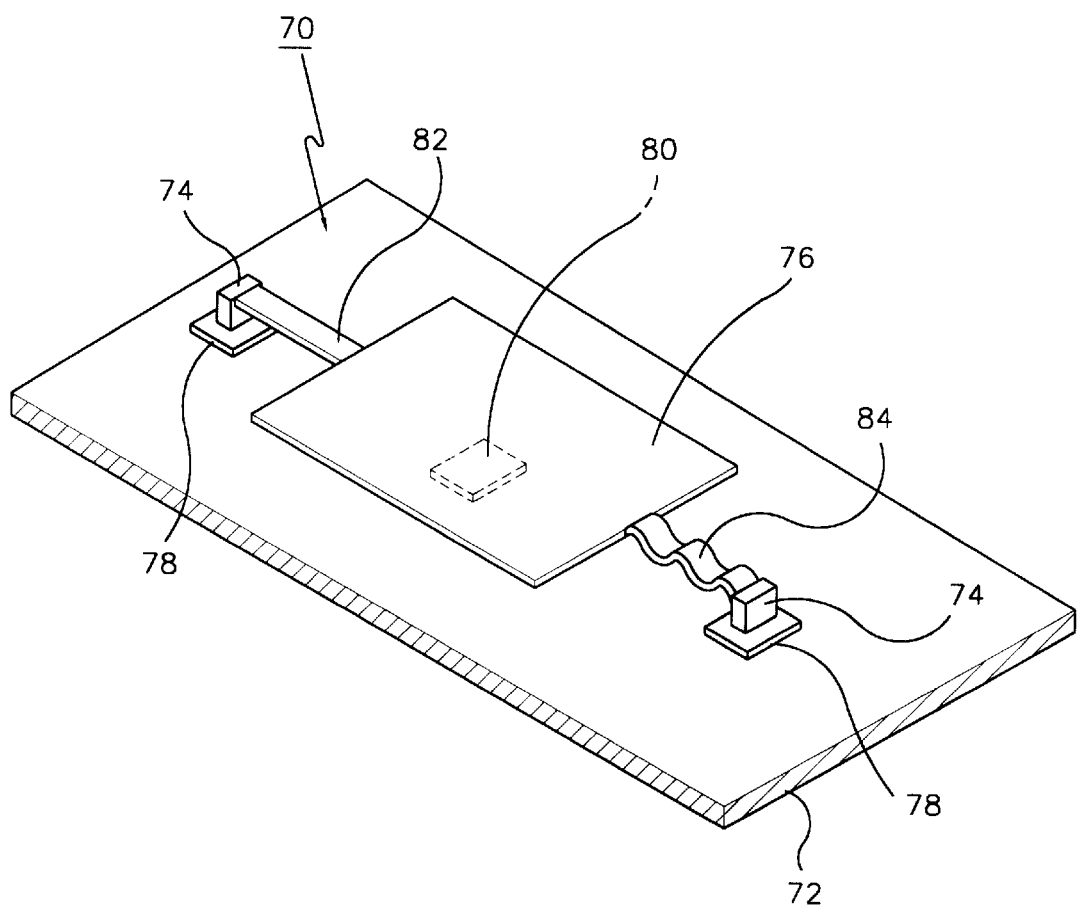
FIG. 5 is a perspective view showing an actuator of the present invention having an asymmetric rigid structure for changing an optical beam path.

FIG. 5 shows an actuator 70, for changing an optical beam path, according to the present invention. Actuator 70 is installed in an image projection section, similar to that shown in FIG. 1, so as to project color beams (red, green and blue) emitted from a beam source (similar to 10 of FIG. 1)

towards a screen (similar to 2 of FIG. 1) by changing the path of the incident beam and the inclination angle of the reflection beam with respect to the incident beam.

Actuator 70 includes a base plate 72 installed on a cover (similar to 22 of FIG. 1), a pair of support plates 74 which are installed on the upper surface of base plate 72 and are spaced a predetermined distance apart from each other. Actuator 70 also includes a reflecting plate 76, disposed between the pair of support plates 74, for reflecting the incident beam at a predetermined angle. Reflecting plate 76 is made by a metal having a high reflexability. Asymmetric members are connected to both support plates 74 and reflecting plate 76 so as to support reflecting plate 76. Electrodes 78 are installed on the upper surface of base plate 72, and a driving electrode 80 is disposed between electrodes 78. The asymmetric members include first and second springs 82 and 84 which are respectively connected to both sides of reflecting plate 76 and have a different coefficient of stiffness from each other.

Figure 6A:
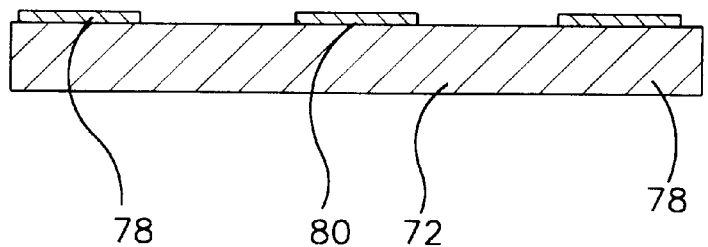
FIGS. 6a to 6e are views showing a process for manufacturing the actuator, for changing an optical beam path, according to the present invention.
Figure 6B:
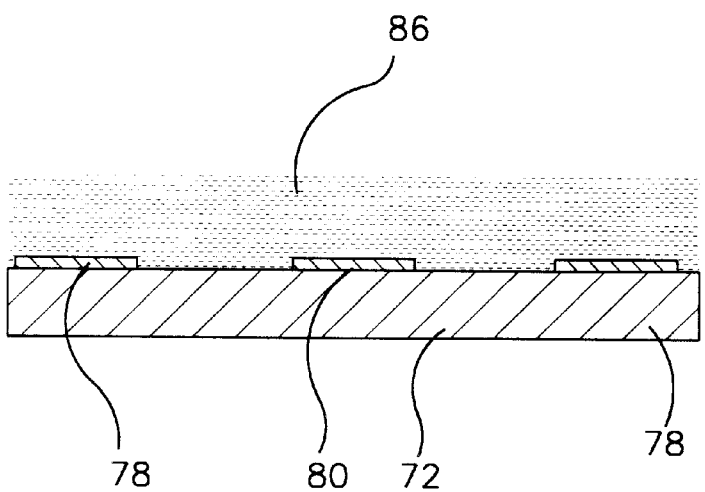
Figure 6C:
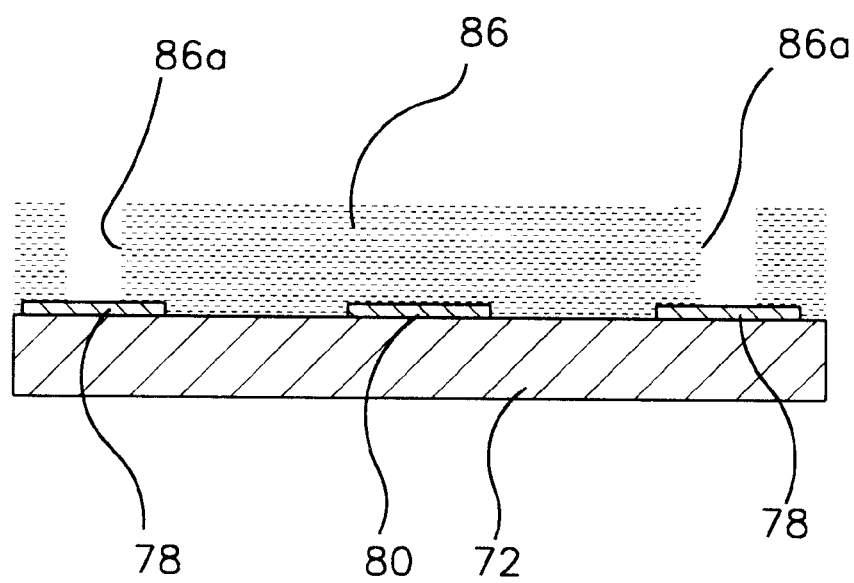
Figure 6D:
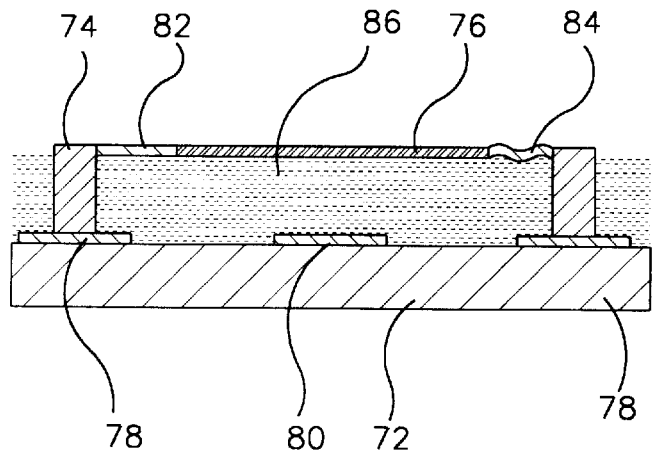

Actuator 70 is manufactured according to a manufacturing process as shown in FIGS. 6a to 6e. As shown in FIG. 6a, metal electrodes 78 are installed on the upper surface of base plate 72 and driving electrode 80 is installed between electrodes 78. Next, a sacrifice layer 86 made of photoresist or polyamide is formed on the upper surface of base plate 72 by using a spin coating process. In this state, insertion holes 86a, into which support plates 74 are inserted, are formed in sacrifice layer 86 by using a reactive ion etching or a photolithography.

Figure 6E:
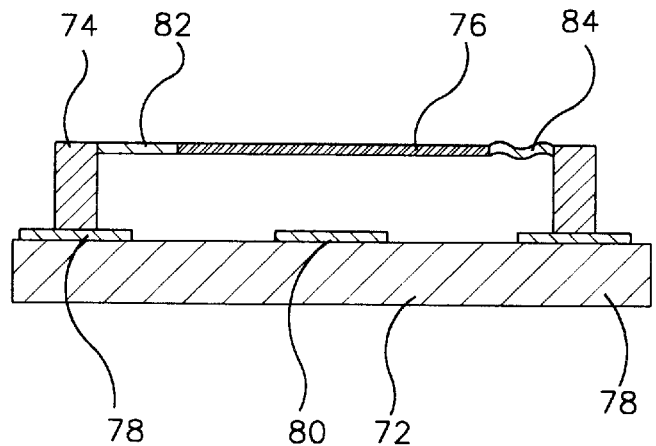

Then, support plates 74 are inserted into insertion holes 86a. Also, first and second springs 82, 84 and reflecting plate 76, which are made of polysilicon or metal, are installed on sacrifice layer 86. After that, sacrifice layer 86 is solidified and then is removed as shown in FIG. 6e. The installation of the above elements is carried out by an evaporation or a sputtering process. First spring 82 has a plate shape in order to have a higher coefficient of stiffness than second spring 84 which has a corrugated shape in order to have a lower coefficient of stiffness.

Hereinafter, a method of driving the actuator for changing the optical beam path is described with reference to FIGS. 7a and 7b.

First, red, green, and blue color beams are sequentially emitted from a beam source (similar to 10 of FIG. 1) for projecting a color picture onto a screen (similar to 2 of FIG. 1). Then, the color beams are introduced into a lens (similar to 12 of FIG. 1), and at the same time, the color beams are reflected at a predetermined inclination angle by reflecting plate 76. Next, the color beams are projected onto the screen through a projection lens (similar to 4 of FIG. 1). That is, because the voltage is not applied to driving electrode 80, a difference of electric potential between driving electrode 80 and reflecting plate 76 is not generated. Because there is no difference of electric potential, reflecting plate 76 connected to first and second springs 82 and 84 maintains its horizontal position as shown in FIG. 6e. Accordingly, the incident beam passing to reflecting plate 76 is reflected at a right angle.

Figure 7A:
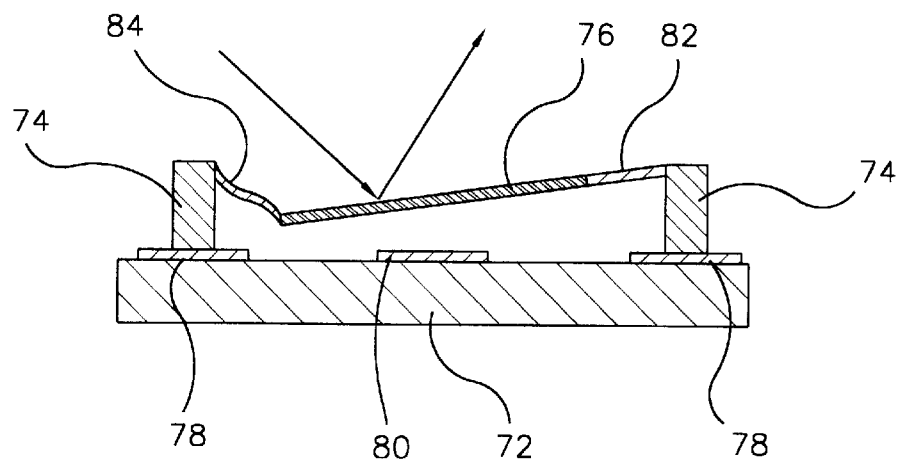
FIGS. 7a and 7b are operational views showing the actuator, for changing an optical beam path, which is driven by a method of the present invention.

In addition, when it is required to project the beam onto the screen at an acute angle, the voltage is applied to both electrodes 78 and driving electrode 80 as shown in FIG. 7a. Then, the voltage is transmitted to reflecting plate 76 through support plates 74 and first and second springs 82 and 84, thereby applying a difference of electric potential between driving electrode 80 and reflecting plate 76. As a result, static electricity is generated such that reflecting plate 76 is inclined toward second spring 84 because spring 84 undergoes a larger amount of deformation as compared with that of first spring 82, which has a higher coefficient of stiffness thereby adjusting a reflection path of the incident beam. The inclination angle of reflecting plate 76 can be adjusted by changing the voltage applied to driving electrode 80 and by changing the shape and stiffness of second spring 84.

When it is required to return inclined reflecting plate 76 to its initial position, the voltage being applied to driving electrode 80 is shut off so that the difference of electric potential between driving electrode 80 and reflecting plate 76 is removed. As a result, reflecting plate 76 is returned to its horizontal position by a restoring force of first and second springs 82 and 84. Accordingly, the asymmetric members are prevented from being damaged and the waste of electric power is reduced.

Figure 7B:
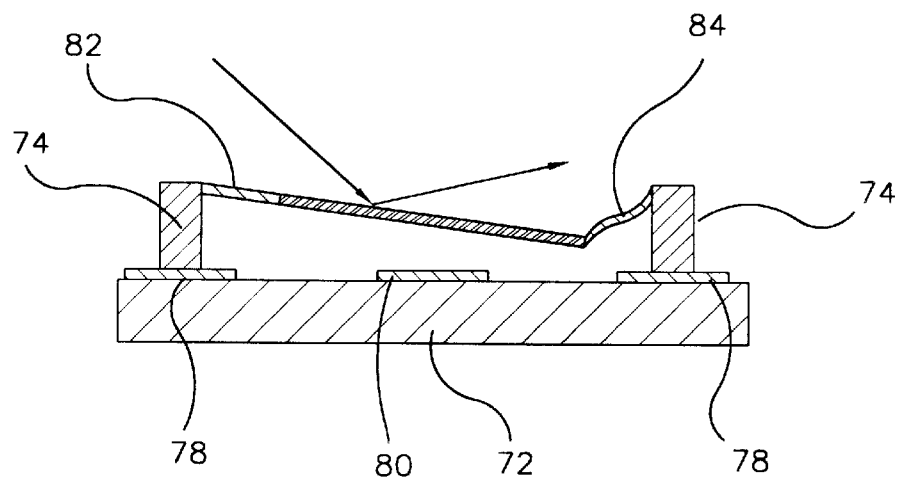

In addition, when it is required to project the beam onto a screen (similar to 2 of FIG. 1) at an obtuse angle, as shown in FIG. 7b, the position of the first and second springs 82 and 84, connected to reflecting plate 76, are reversed as compared with their positions shown in FIG. 7a. Then, if voltage is applied to driving electrode 80, static electricity is generated by the difference of electric potential so that second spring 84 undergoes a larger amount of deformation as compared with that of first spring 82, which has a higher coefficient of stiffness. Reflecting plate 76 is thereby downwardly inclined causing the reflection path of the incident beam and the inclination angle thereof to be large. At this time, if reflecting plate 76 is inclined more than the predetermined angle, the reflection beam projected onto a screen (similar to 2 of FIG. 1) is dissipated.

In order to reflect the incident beam at either an acute angle or an obtuse angle, the positions of first and second springs 82 and 84, having different coefficients of stiffness from each other, can be changed with respect to the side of the reflecting plate from which the beam is incident, as shown in FIGS. 7a and 7b.

As described above, the actuator of the present invention has an asymmetric rigid structure for changing an optical beam path and includes a method for driving the actuator so that a reflecting plate for adjusting the incident path of the incident beam and for adjusting the inclination angle of the reflection beam with respect to the incident beam is asymmetrically inclined, thus allowing the conduit structure thereof to be simply formed. In addition, since the actuator adopts a rigid structure subjected to bending stress, reliable operation of the actuator is attained.

While the present invention has been particularly shown and described with reference to the preferred embodiment thereof, it will be understood by those skilled in the art that various changes in form and details may be effected therein without departing from the spirit and scope of the invention as defined by the appended claims.

What is claimed is:

1. An actuator having an asymmetric rigid structure for changing an optical beam path, the actuator comprising:
   a base plate installed in a cover;
   a pair of first electrodes installed on an upper surface of the base plate by evaporation;
   a driving electrode disposed between the pair of first electrodes;
   a pair of support plates each installed on a respective first electrode for receiving a voltage from the first electrode;
   a reflecting plate for reflecting an incident beam emitted from a beam source, the reflecting plate being disposed between the pair of support plates; and first and second springs which are each respectively connected to one of the support plates and the reflecting plate for adjusting an incident path of the incident beam and an inclination angle of a reflection beam with respect to the incident beam, the first and second springs having a different coefficient of stiffness from each other.

2. The actuator as claimed in claim 1, wherein the shape of the first and second springs are different from one another so that when a static electricity is generated between the driving electrode and the reflecting plate, the incident path of the incident beam and the inclination angle of the reflecting beam are variably adjusted.

3. The actuator as claimed in claim 1, wherein the reflecting plate has a point of incidence for receiving an incident beam, wherein the point of incidence is closer to said first spring than to said second spring.

4. The actuator as claimed in claim 3, wherein said first spring has a higher coefficient of stiffness than said second spring.

5. The actuator as claimed in claim 3, wherein said second spring has a higher coefficient of stiffness than said first spring.

6. A method of driving an actuator having an asymmetric rigid structure for changing a path of an incident beam and an inclination angle of a reflection beam with respect to the incident beam, the method comprising the steps of:

(a) applying a voltage to first electrodes which are installed on a base plate, by evaporation, in such a manner that the voltage is transmitted to a reflecting plate which reflects the incident beam;

(b) generating a static electricity between the reflecting plate and a driving electrode by applying voltage to the driving electrode which is installed between the first electrodes;

(c) making an inclination angle by inclining the reflecting plate towards the one of a pair of asymmetric members connected to the reflecting plate, having a larger amount of deformation than the other;

(d) projecting the reflection beam at an angle by introducing the incident beam into the reflecting plate;

(e) shutting off the voltage applied to the first electrodes and driving electrode thereby removing a difference of an electric potential between the driving electrode and the reflecting plate; and (f) returning the reflecting plate to a horizontal position thereof by a restoring force of the asymmetric members.

7. The method as claimed in claim 6, wherein step (c) further comprises a step of changing, with respect to each other, the positions of the asymmetric members connected to the reflecting plate thereby adjusting the inclination angle of the reflecting plate.

8. The method as claimed in claim 6, wherein step (d) further includes projecting the reflection beam at an acute angle by introducing the incident beam into the reflecting plate from the side of the reflecting plate closer to the asymmetric member having the larger amount of deflection.

9. The method as claimed in claim 6, wherein step (d) further includes projecting the reflection beam at an obtuse angle by introducing the incident beam into the reflecting plate from the side of the reflecting plate closer to the asymmetric member having the smaller amount of deflection.

* * * * *